(12) United States Patent
Walker

(10) Patent No.: US 8,483,211 B2
(45) Date of Patent: Jul. 9, 2013

(54) METHOD AND SYSTEM FOR GLOBAL ANCHOR REGISTRATION

(75) Inventor: John Michael Walker, The Hague (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 610 days.

(21) Appl. No.: 12/531,356

(22) PCT Filed: Mar. 15, 2008
(Under 37 CFR 1.47)

(86) PCT No.: PCT/IB2008/000580
§ 371 (c)(1),
(2), (4) Date: Sep. 7, 2010

(87) PCT Pub. No.: WO2008/110902
PCT Pub. Date: Sep. 18, 2008

(65) Prior Publication Data
US 2012/0269182 A1    Oct. 25, 2012

Related U.S. Application Data

(60) Provisional application No. 60/894,979, filed on Mar. 15, 2007.

(51) Int. Cl.
*H04L 12/66*    (2006.01)
*H04L 12/28*    (2006.01)

(52) U.S. Cl.
USPC ......................................... 370/352; 370/401

(58) Field of Classification Search
None
See application file for complete search history.

(56) References Cited

U.S. PATENT DOCUMENTS

| | | | |
|---|---|---|---|
| 7,185,067 B1 * | 2/2007 | Viswanath et al. | 709/217 |
| 2002/0110112 A1 * | 8/2002 | Tuomi | 370/352 |
| 2003/0182433 A1 | 9/2003 | Kulkarni et al. | |
| 2004/0157620 A1 * | 8/2004 | Nyu | 455/456.1 |
| 2004/0235473 A1 * | 11/2004 | Sanchez | 455/435.2 |
| 2005/0131900 A1 * | 6/2005 | Palliyll et al. | 707/10 |
| 2006/0034270 A1 * | 2/2006 | Haase et al. | 370/389 |
| 2007/0242601 A1 * | 10/2007 | Gbadegesin et al. | 370/216 |
| 2007/0243876 A1 * | 10/2007 | Duan | 455/445 |
| 2008/0280617 A1 * | 11/2008 | Aguilar et al. | 455/445 |

* cited by examiner

*Primary Examiner* — Andrew Lee
(74) *Attorney, Agent, or Firm* — Roger S. Burleigh

(57) ABSTRACT

A user equipment (UE) attaches to a first access network, intending to access a packet data network (PDN) via a telecommunications system, and is assigned a PDN System Architecture Evolution (SAE) Gateway (GW). The identity of the PDN SAE GW is registered so that, if the UE attaches to another access network, triggering a new attach procedure, the identity is retrieved. A determination is then made whether the previously-assigned PDN SAE GW may be used for the present communications and, if so, it is reassigned. The identity of the PDN SAE GW is registered in an anchor node, which is in a preferred embodiment a Home Subscriber Server (HSS). If the previously-assigned PDN SAE GW cannot be used, or if the PDN SAE GW must be changed, then the communication is reassigned to a new PDN SAE GW.

20 Claims, 9 Drawing Sheets

METHOD AND SYSTEM FOR GLOBAL ANCHOR REGISTRATION

RELATED APPLICATIONS AND CLAIM OF PRIORITY

The present Application is related to and claims the benefit of the filing date of U.S. Provisional Patent Application No. 60/894,979, filed 15 Mar. 2007, which is incorporated herein by reference in its entirety.

TECHNICAL FIELD

The present invention is directed, in general, to wireless telecommunication systems, and, more specifically, to a method and system for global anchor registration and, if necessary, reassignment in a telecommunication system having multiple accesses, though which UE (user equipment) may connect to an external network.

BACKGROUND

Mobile radio communications systems have become increasingly common. Although they have been in use for many years, their application was often limited by power requirements for any useful range and the limited amount of radio spectrum that could be allocated for general use. More recently, modern radio communication networks allow a great number of communication sessions to take place simultaneously. Generally speaking, this is possible because users may communicate over an air interface with a relatively-local station, which in turn is connected to a larger network through which communications may be routed to practically any other area on earth. The number of users and the number of mobile applications available to those users have both increased dramatically. These applications involve not only mobile telephony, but data transmission to and from mobile units as well.

FIG. 1 is a simplified block diagram illustrating the relationship between selected components of a typical radio communication system 10. In this example, system 10 includes UE (user equipment) 12. UE 12 may be, for example, a mobile telephone, but my also be a laptop computer with wireless capability, a two-way pager, or even a dedicated gaming station. The term 'UE' is intended to broadly include all such devices. Typically, UE 12 is a mobile device, but of course could be any radio device whether it is operated as a fixed or mobile station.

In operation, UE 12 establishes a communication link with access point 14 via one or more radio channels 13. As used here, the access point 14 may include a single antenna coupled with a base station or controller, but may also represent an access network, that is, a collection of interconnected antennae and base stations, among other components. In any case, access point 14 is in communication with telecommunication system 15, which represents a typically large collection of interconnected switching nodes and other components that route communications to and from UE 12 (through access point 14) to and from their destination. This destination may, for example, be another UE communicating with telecommunications system 15. It may also be another entity accessible through another network, for example external packet data network (PDN) 17.

To access PDN 17, communications are routed through gateway 16. Even though only a single gateway depicted in FIG. 1, other gateways may exist for communication with other networks, or even for additional connections to the PDN 17. Switching nodes (not shown) within telecommunication system 15 determine when it is necessary to route communications with UE 12 through gateway 16, or some other gateway. In that event, a communication path such as a bearer channel is established to carry this traffic until it is no longer needed, for example when the communication session has been terminated.

The system 10 depicted in FIG. 1 is extremely simplified. In reality, systems involve a large number of interconnected components that interface with each other to not only carry voice and data traffic, but also signals forming messages that carry instructions from one component to one or more others. Because these systems can be very complex, and often must interface with very different types of networks, standard protocols have been developed to either standardize operations or provide a way for differently operated systems to interact with each other.

The 3GPP ($3^{rd}$ Generation Partnership Project) is a collaborative group for drafting and promulgating technical specifications for $3^{rd}$ generation mobile telephony systems. Ideally, this will result in faster and more efficient service while ensuring smooth transitions so that discontinuity in existing services in minimized. For example, system architecture to accommodate roaming UE is defined in 3GPP technical specification TS 23.402.

FIG. 2 is a block diagram illustrating a roaming architecture for an SAE (System Architecture Evolution) system 50, as set forth in 3GPP TS 23.402 V.0.2.0. In FIG. 2, it may be seen that the system 50 may be generally organized into entities of the HPLMN (home public land mobile network) 30 and VPLMN (visiting public land mobile network) 40, with non-3GPP access networks 20 depicted in a third section. Note that some, but not all of the components in the 3GPP SAE roaming architecture will be referred to here as background for describing the present invention. The reference numbers in FIG. 2 have been added for convenience and are not part of the 3GPP technical specification.

The PDN 17 illustrated in FIG. 1 may, for example, be considered roughly analogous to the Operator IP (Internet protocol) Services Network 31 shown in FIG. 2. Examples of a PDN 31 are: an IP Multimedia Subsystem IMS, or a Packet-switched Streaming Service System PSS. An example of a node in PDN 31 is a Call Session Control Function CSCF. The remainder of the system 50, in general, communicates with node in 31 through a gateway (GW), specifically PDN SAE GW 33 over a defined interface that is referred to as SGi in the technical specification and FIG. 2. A PDN SAE GW 33 can be considered as an instantiation of a Mobile IP Home Agent (e.g. as defined by RFC 3775), which maintains a correlation between a device's Home Address (HoA, an IP address assigned by the user's home network e.g by the HA) and the Care-of-Address (CoA, an IP address used by the device on the foreign network so it is reachable while away from the home network). A UE (not shown in FIG. 2) communicates with the system 50 though a number of available access networks, some of which are defined in the 3GPP technical specifications and others (WLAN and WiMAX networks, for example) which are not. For this reason, as may be seen in FIG. 2, the SAE roaming architecture considers both 3GPP access networks and non-3GPP access networks. The communication path established for data communications will vary according to the type of access network to which a UE attaches.

UE attaching to a non-3GPP network 21 or 22 communicate with the PDN SAE GW 33 with the aid of a 3GPP AAA (authentication, authorization, and accounting) server 32 (via, in system 50 of FIG. 2, an AAA proxy server 42). As another example, the LTE (Long Term Evolution) radio access network 41 communicates through serving SAE GW 43 with the aid of MME (mobility management entity) 44. AAA server 32 and MME 44 are sometimes referred to as control plane entities, and send messages for the control of communications for the various nodes they are associated with. Both communicate with HSS (home subscriber server) 35, which maintains information about, among other things, individual UEs and their whereabouts that is of use when they are roaming (visiting other networks outside of their home network). This information is sometimes referred to as soft state information and sometimes changes as the UEs travel from one area to another. In some cases, soft state information is also (or instead) maintained in the PCRF (policy and rules changing function) node 36.

The functions of each of these selected components is pointed out only generally because their operation is described in the 3GPP technical specifications TS 23.401 V.0.2.0. and TS 23.402 V.0.2.0., which are incorporated here by reference, but are also considered known in the art. Although these technical specifications are very detailed, some areas for development still exist where the existing standards allow for potential problems to arise. Two such issues will now be explained in more detail with reference to FIGS. 3a and 3b. FIGS. 3a and 3b are simplified block diagrams illustrating a potential disruption of service problem inherent in systems of the existing art, such as SAE systems operable according to current system specifications. The problems referred to here may occur when a UE that is attached to one access network moves, and becomes attached to another instead. The problems are especially likely when the switch is between 3GPP accesses and non-3GPP accesses. In FIGS. 3a and 3b, the access networks are referred to generally as 310 and include 3GPP access networks 315 and non-3GPP access networks 311. The 3GPP access networks 315 (including networks 316, 317, and 318) are in communication with serving SAE GW 345 and through it to GW pool 330. The 3GPP networks also communicate with control plane entity MME 344. The non-3GPP networks 311 (including networks 312 and 313) are in communication with GW pool 330 and AAA server 342. GW pool 330 includes PDN SAE GWs 331, 332, and 333.

In FIG. 3a, UE 320 is shown attached to LTE 318 and communicating with PDN SAE GW 332 via a communication path (in this example an SAE bearer) 325. PDN SAE 332 in turn communicates with an external PDN (not shown) via SGi interface 327. Note that PDN SAE GW 332 was assigned to this function when UE 320 attached to the LTE 320, and effectively terminated the bearer 325. UE 320 may change access networks, however, for example when roaming from one area to another; the UE 320 may wish to maintain the current services being used in the previous access without experiencing service disruption. In FIG. 3b, UE 320 has changed and attached to non-3GPP network 313. When this occurred, a new attach procedure was triggered, meaning that a new PDN SAE GW is going to be assigned. This new PDN SAE GW is not necessarily the same as the one previously handling communications between UE 320 and the external PDN. In FIG. 3b, for example, PDN SAE GW 331 has been assigned and is communicating with the external PDN via SGi interface 328. Unfortunately, data packets received in PDN SAE GW 332 (as it was previously assigned to the communication) can no longer be forwarded to UE 320 since bearer 325 has been replaced by bearer 326 terminating at PDN SAE GW 331. These packets may simply be discarded, perhaps resulting in a perceivable disruption in service. A similar problem may occur when UE 320 leaves a non-3GPP access network and attaches to a 3GPP access network.

In general, the current technical specifications do not provide adequately for situations where an access network change may trigger the assignment of a new PDN SAE GW from a GW pool and thus cause service disruption to the UE 320.

SUMMARY

To address the above-discussed deficiencies of the prior art, it is a primary object of the present invention to provide a method and arrangement for permitting efficient access by a UE (user equipment) device.

In one aspect, the present invention is a method for providing access to an external network via a telecommunication system that includes detecting that a user has attached to an access network in communication with the telecommunication system, determining whether a gateway to access the external network has been assigned to handle communications between the user and the external network, assigning a gateway to handle these communications based on this network, and registering the gateway in a global anchor. A communication path is established from user to the assigned gateway. The communication path may, for example, be a bearer or tunnel. The method may further include detecting that the user has subsequently attached to a different access network, retrieving the identity of the previously-assigned gateway, and using the previously-assigned gateway to establish a communication path from the user to the gateway to avoid the user experiencing service disruption. The gateway may or may not be re-registered in the global anchor.

In another embodiment, a determination is made to assign a different gateway for handling communications between the user and the external network after a communication path has been established. This embodiment may further include registering the identity of the new gateway in the global anchor, notifying the old gateway of the switch, and notifying the user of the new gateway assignment. The method may further include establishing a new communication path from the user to the new gateway, and either using the old gateway as a proxy to avoid the loss of packets when the communication path switches from the old gateway to the new gateway, or in the alternative buffering packets in the old gateway for forwarding to the new gateway when the switch has been completed.

In a preferred embodiment, the telecommunications system is configured according to the SAE roaming architecture and the gateway is a PDN SAE GW, one of a plurality of such devices forming a GW (gateway) pool. The global anchor in one embodiment is then the HSS, and an interface is defined between the GW pool and the HSS. In another SAE compatible embodiment, the PDN SAE GW interface is not necessary because messaging related to the present invention is performed through the various control plane entities.

In another aspect, the present invention is a system for providing UE (user equipment) access to an external network including a plurality of access networks for accessing a telecommunications system, a plurality of gateways for communication between the telecommunications system and the telecommunications network, and an anchor node arranged to maintain information related to the UE. The anchor node is further arranged to register the identity of a gateway assigned by the at least one control plane entity upon receipt of a registration message. The anchor node is further arranged to transmit the identity of the previously assigned gateway upon receiving a request from the at least one control plane entity.

In a preferred embodiment, the system is configured according to the SAE roaming architecture and the gateways are PDN SAE GWs. The global anchor in one embodiment is then the HSS, and an interface is defined between the gateways and the HSS. In another SAE-compatible embodiment, the PDN SAE GW interface is not necessary because messaging related to the present invention is performed through the various control plane entities. The anchor node may also be a PCRF.

In yet another aspect, the present invention is an anchor node for a telecommunications system, the anchor node for facilitating UE access to an external network through a gateway. In a preferred embodiment, the global anchor is arranged to register an identifier associated with the gateway upon receiving a registration message and to transmit the gateway identifier to a control plane entity during an attach procedure. In a preferred embodiment, the telecommunications system is configured according the SAE roaming architecture and the anchor node is either an HSS or a PRCF, the gateway being a PDN SAE GW.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the terms "node" (such as a PDN SAE GW, PCRF, HSS, etc) means any device, system or part thereof that controls at least one operation, such a device may be implemented in hardware, firmware or software, or some combination of at least two of the same. It should be noted that the functionality associated with any particular node may be centralized or distributed, whether locally or remotely.

In particular, a node may comprise one or more data processors, and associated input/output devices and memory, that execute one or more application programs and/or an operating system program.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 4 through 9, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged multiple access telecommunications system accessible to an external network via a plurality of gateways.

The present invention addresses the problems described above by providing a manner of establishing a global anchor for communications between a UE and an external network via a multiple access telecommunication system. This global anchor is established in a common node over new or, alternately over existing interfaces. The establishment and use of the global anchor will now be described.

Figure 4:
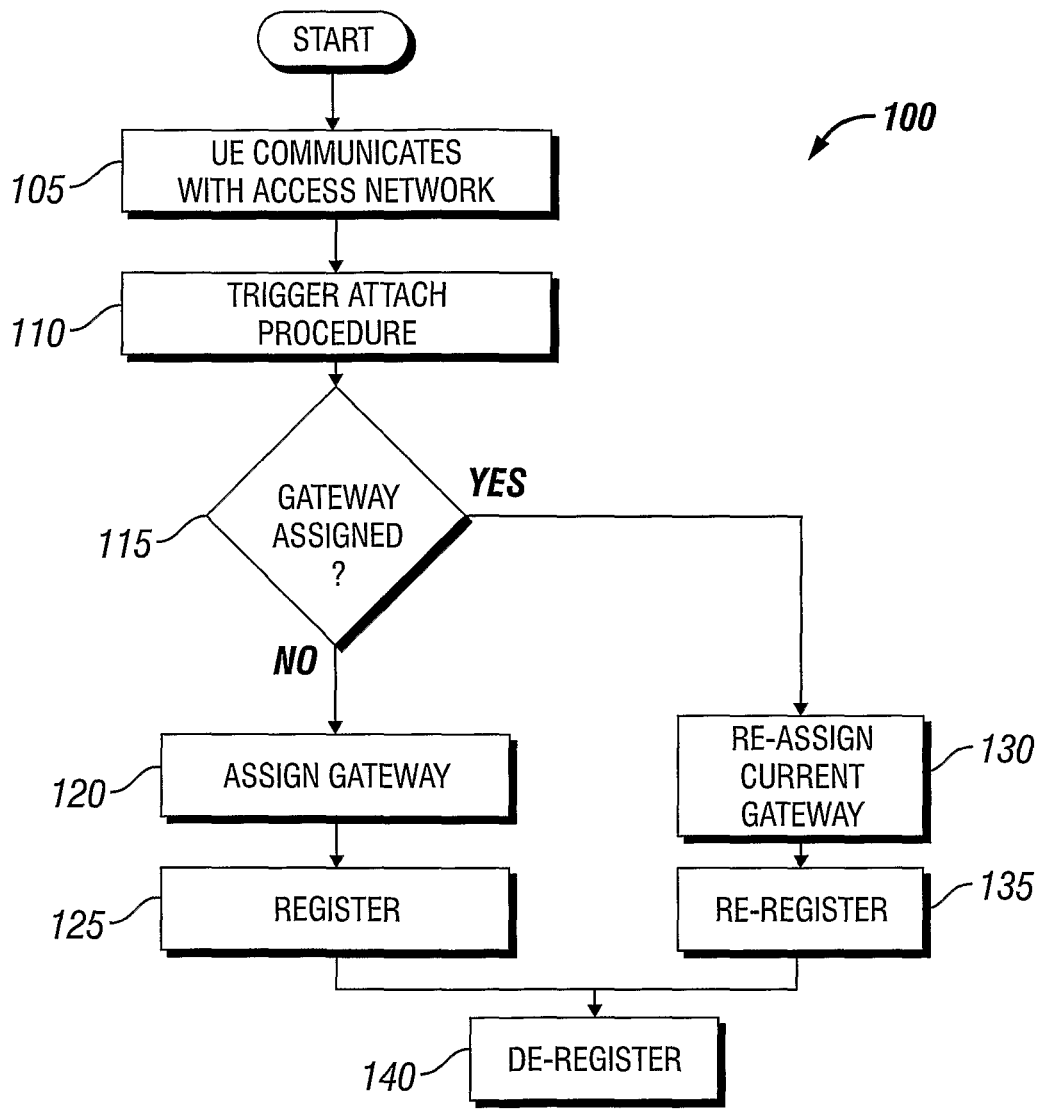
FIG. 4 is a flow diagram illustrating a method of providing user access according to an embodiment of the present invention.

FIG. 4 is a flow diagram illustrating a method 100 of providing user access to an external network via a telecommunications system according to an embodiment of the present invention. At START, it is presumed that the components necessary for performing the method are available and arranged to be operational according to the invention. The user is equipped with a UE device, which will be communicating with an external packet data network via a multi-access telecommunications system. Multi-access in this sense means there are several access networks through which the UE may access the telecommunications system, but no particular number or type of access network is required unless explicitly recited. The method then begins when the UE communicates with an access network (step 105) for the purpose of communicating with the external network. The access network provides access to the telecommunications system through which a communication path toward the external network may be established. This communication triggers an attach procedure (step 110).

To route the communications to the external network, a gateway must be assigned. Rather than assign a new gateway immediately, according to the present invention, a determination is made as to whether a currently-assigned gateway may be used for communications involving this UE (step 115). If not, a new gateway is assigned (step 120) using whatever decision-making routine is in place. The identity of this new gateway is then registered (step 125) in a global anchor node. If, on the other hand, the determination at step 115 indicates that there is a currently-assigned gateway, that is, one that is registered for the UE in the global anchor, it is then re-assigned (step 130), and continues to be used for communications between the UE and the external network. Preferably, the identity of the gateway is then re-registered (step 135) in the global anchor to ensure that the information there is current. It is noted that the re-assignment and re-registration steps may involve similar, if not identical messaging to the assignment and registration steps performed if no gateway is determined (at step 115) to be currently assigned. This is not necessarily the case, and so these steps are depicted separately.

In this manner, an existing communication session between the UE and the external network may continue with minimal service disruption and loss of data. In a preferred embodiment, when the communication path through the gateway is no longer required, the gateway is de-registered (step 140) in the global anchor. Should the UE subsequently attach to one of the access networks for communication, there would be no need to use the previously-assigned gateway and deregistration allows that a new gateway may simply be assigned (at step 120).

Figure 1:
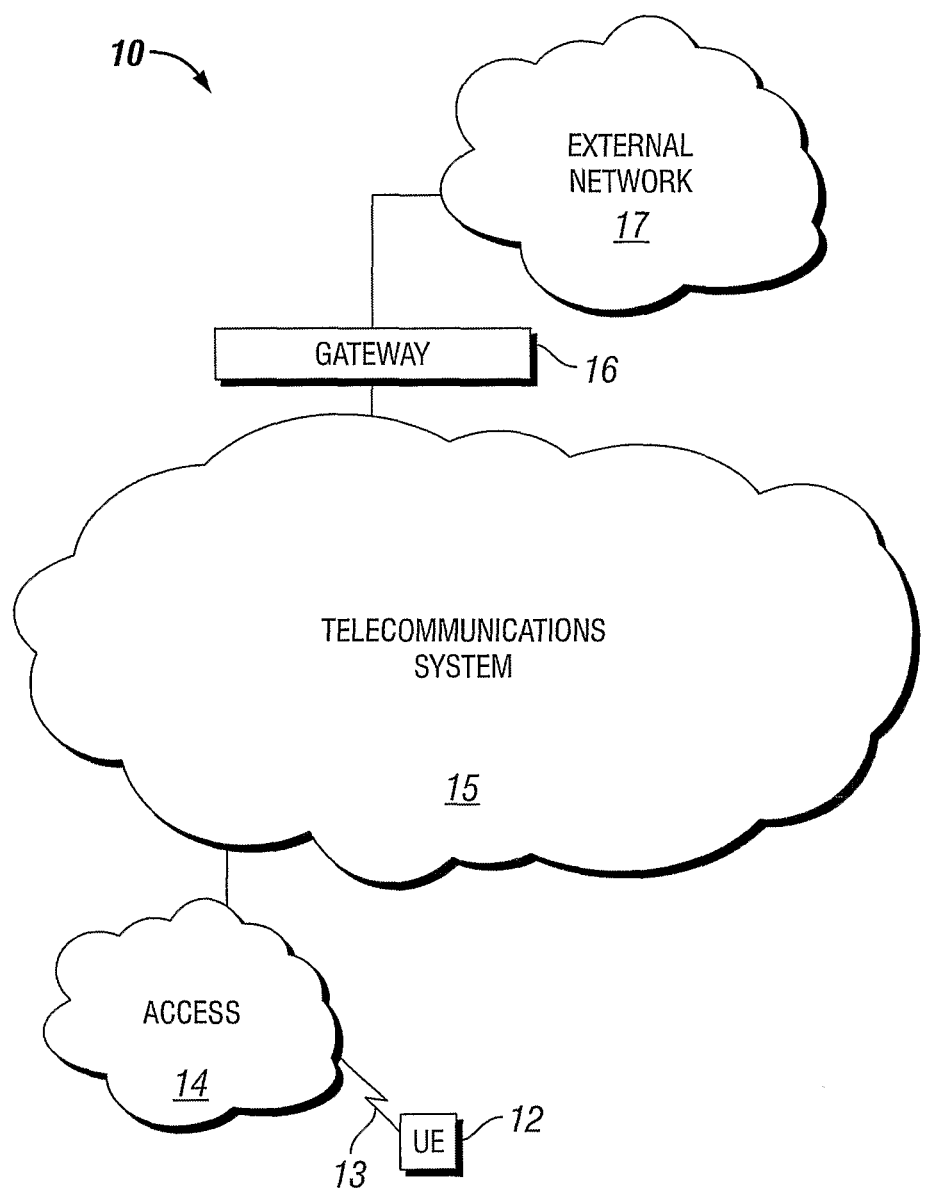
FIG. 1 is a simplified block diagram illustrating the relationship between selected components of a typical radio communication system.
Figure 2:
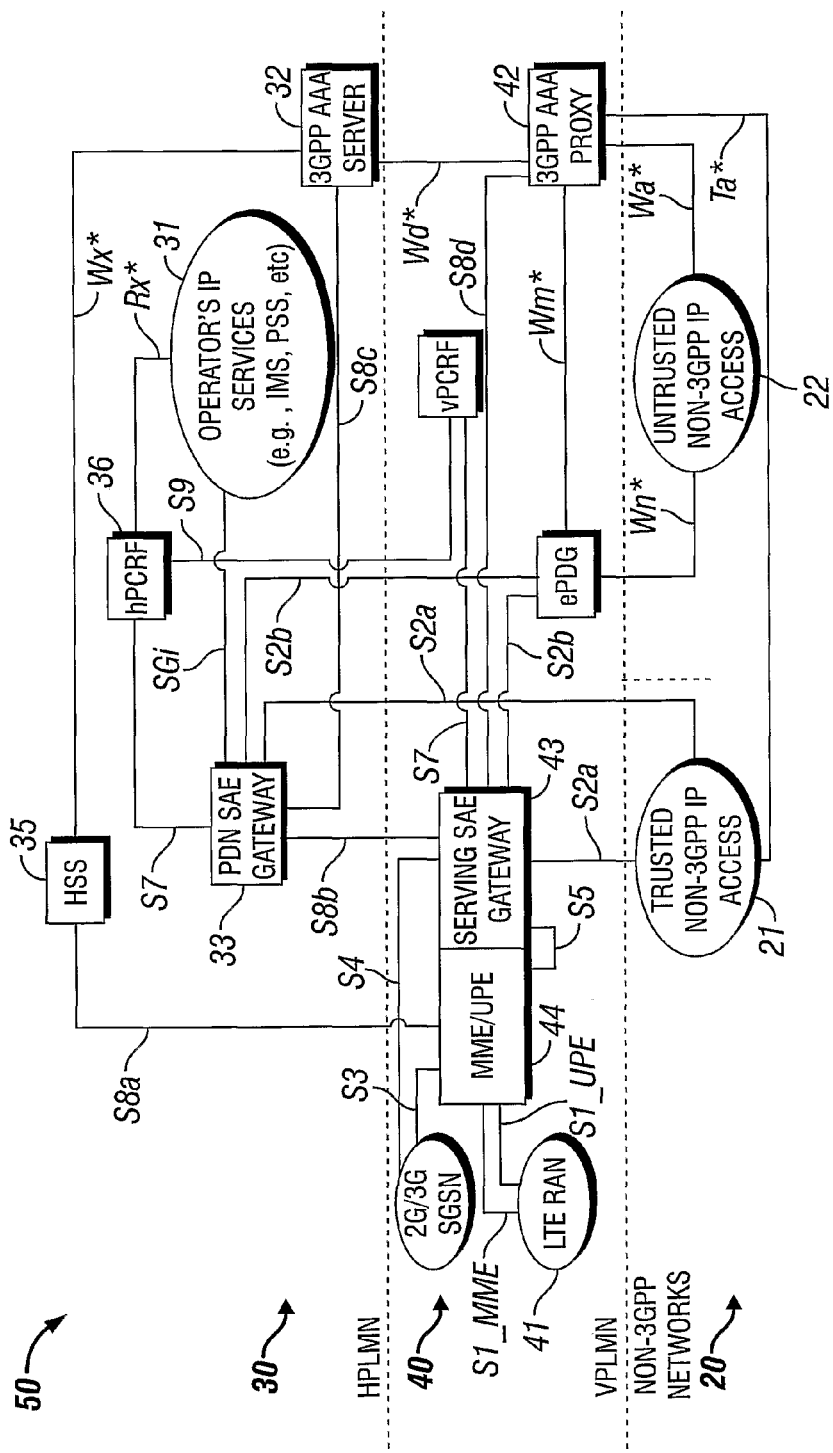
FIG. 2 is a block diagram illustrating a roaming architecture for an SAE system, as set forth in 3GPP TS 23.402.

In an exemplary embodiment, the telecommunication system and access networks are configured according to an SAE (System Architecture Evolution) roaming architecture such as the one depicted in FIG. 2. In this case, the external network may be a PDN (packet data) network and the gateway (GW) is a PDN SAE GW. The access networks may be, for example, a 3GPP LTE (Long Term Evolution) network or a non-3GPP network such as a WLAN (wireless local area network). The global anchor, in which the identity (typically the address) of the currently-selected gateway is registered, may be for example an HSS (home subscriber server) or a PCRF (policy and rules changing function) node. The following descriptions of will be discussed in terms of this exemplary embodiment with the understanding that they are applicable to other types of networks as well.

Figure 3:
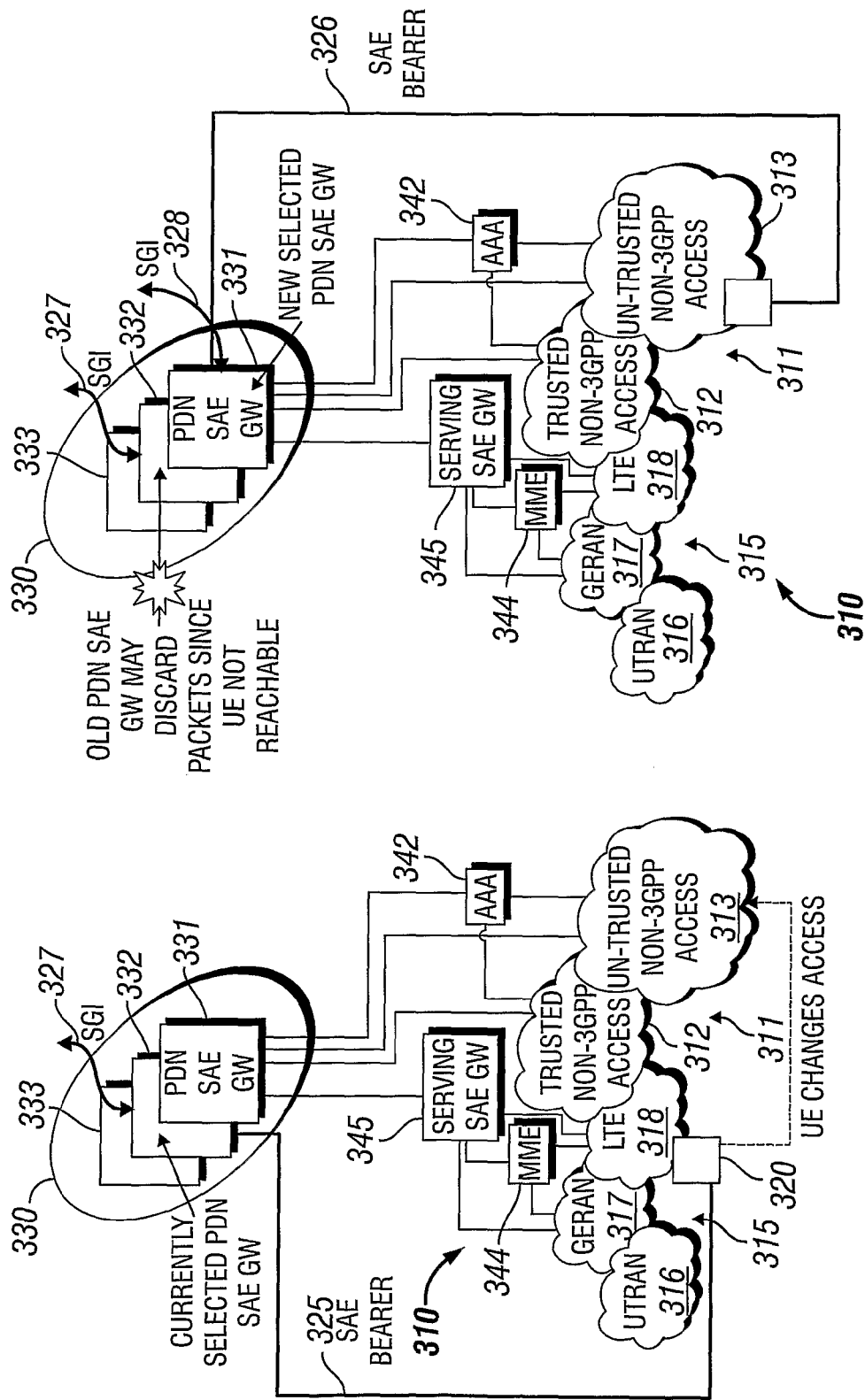
FIGS. 3a and 3b are simplified block diagrams illustrating a potential disruption of service problem inherent in systems of the existing art, such as SAE systems operable according to current system specifications.
Figure 5A:
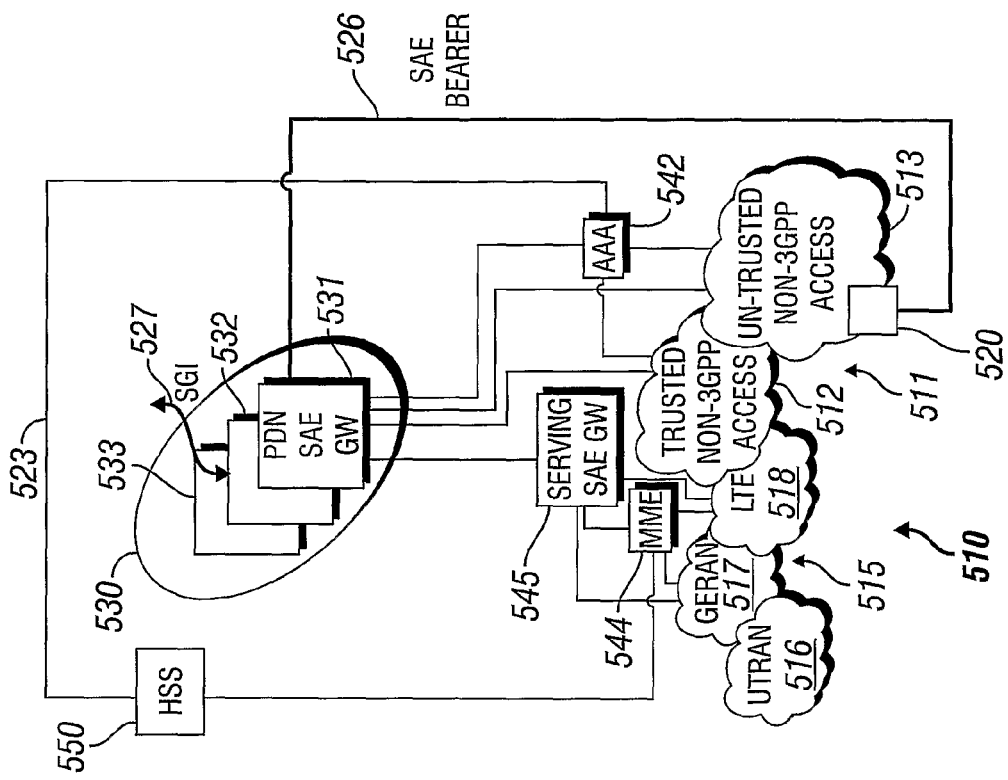
FIGS. 5a and 5b are simplified block diagrams illustrating a system for facilitating global anchor registration according to an embodiment of the present invention.
Figure 5B:
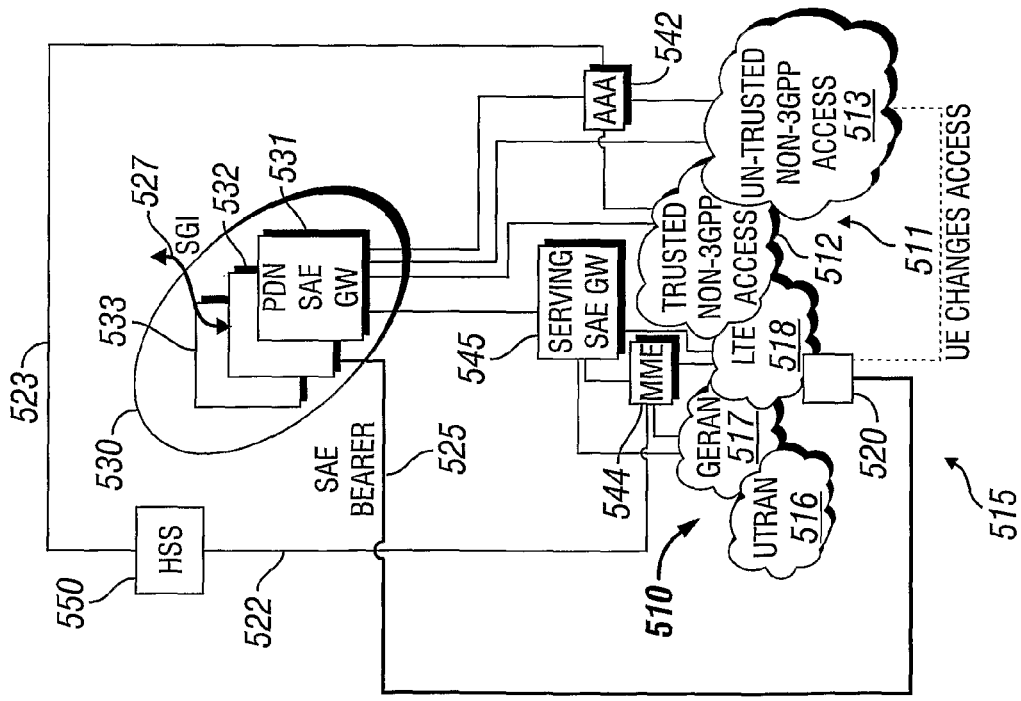

FIGS. 5a and 5b are simplified block diagrams illustrating a telecommunications system 500 arranged for facilitating global anchor registration according to an embodiment of the present invention. It is noted that the systems depicted here share common components and interfaces with those depicted in FIGS. 3a and 3b, and similar components are numbered analogously. Non-3GPP access networks 511, for example, may include a trusted access network 512 or a non-trusted access network 513. The 3GPP access networks 515 may include a UTRAN access network 516, a GERAN access network 517, or an LTE network 518. Note that these access networks 510 are exemplary, and need not all be present. In some embodiments, other access networks may be used as well. In this embodiment, each non-3GPP access network 511 is coupled to the GW pool 530 and to an AAA server 542. Each 3GPP access network 515 is coupled to the GW pool 530 via a serving SAE GW 545, and also to an MME 544. The AAA 542 and the MME 544 serve as control plane entities and are also in communication with a common server, in this embodiment HSS 550. In FIGS. 5a and 5b, the GW pool 530 is shown to include PDN SAE GWs 531, 532, and 533, although any number, including a single gateway, may be present. In that regard, note that the present invention may be implemented where there is only one PDN SAE GW in a 'pool', but all of the advantages of the present invention, in that case, will not be realized. SGi interface 527 provides for communication between PDN SAE GW 532 and the external packet data network (not shown). Each of the other PDN SAE GWs have a similar interface available, but they are also not shown.

In FIG. 5a, UE 520 as shown has attached to LTE 518 and a communication path, in this embodiment bearer channel 525, has been established. Bearer 525 connects UE 520 with PDN SAE GW 532, and ultimately with the external packet data network (not shown) via SGi interface 532. In accordance with the present invention, the identity of PDN SAE GW 532 has been registered with the HSS 550, for example in the form of PDN SAE GW 532's address. This address, and possibly other information as well such as the UE 520 user's home address, has been provided to the HSS 550 and may be stored there as soft state information associated with the user. The PDN SAE GW address and, if present, other information may be provided to the HSS 550 in a number of different ways.

As can be seen in FIGS. 5a and 5b, interface 521 is provided between HSS 550 and GW pool 530. This interface 521 is new and not currently defined in the SAE roaming architecture (see FIG. 2). To use this interface, the PDN SAE GW first obtains the user's identity. This may be done in the form of an NAI message, a MSISDN message, or an IMSI message, transmitted as part of a registration request, binding update, tunnel establishment, or bearer set-up operation, for example using MIP (mobile IP) or GTP (GPRS transfer protocol) procedures. The PDN SAE GW 532, then, may use this to register its own identity in the HSS, along with any other desirable information that is available to it.

At some point in while bearer 525 still terminates at PDN SAE GW 532, and while communications via bearer 525 may be ongoing, UE 520 may attach to another access network. As shown in FIG. 5b, in this embodiment UE 520 has become attached to an (untrusted) non-3GPP network 513. As explained above, this may cause an undesirable service disruption as a new attach procedure is triggered, possibly causing the assignment of a new PDN SAE GW from GW pool 530. In accordance with this embodiment of the present invention, however, when the attach procedure is triggered, the relevant control plane entity attempts to retrieve a current PDN SAE GW from the HSS 550. In the embodiment of FIG. 5b, the relevant control plane entity is the AAA server 542. If no such PDN SAE GW identity is available for retrieval, then the AAA server 542 concludes that no PDN SAE GW is currently assigned, and assigns a new one. The identity of the new PDN SAE GW is then, of course, registered in the HSS 550 as described above.

On the other hand, if the AAA server 542 is able to retrieve a PDN SAE GW address, then it concludes that this PDN SAE GW is currently-assigned, and proceeds to set up an SAE bearer terminating at this PDN SAE GW. In effect, the AAA server 542 is assigning the currently assigned PDN SAE GW as the gateway of choice; a new PDN SAE GW selection is not performed. In FIG. 5b, this communication path is referred to as bearer 526. Of course, in some cases the communication path established may be a tunnel (not represented in FIG. 5b), depending on the circumstances. In some embodiments, however, the identity of the PDN SAE GW will be re-registered in the HSS 550. In any event, once registered, the PDN SAE GW identity will be available for later retrieval if necessary.

It should be noted that the conclusion of the AAA server 542 may be incorrect where a PDN SAE GW has been assigned, and is in use, but for some reason its identity was not successfully retrieved. In this case a new PDN SAE GW assignment will be made, giving rise to the attendant risk of service disruption, but the new PDN SAE GW identity will be registered and hopefully the mis-retrieval will not occur again. In some embodiments, the risk of such an error occurring may be reduced or eliminated by providing the AAA server 542 with certain registration information from each PDN SAE GW in advice, although this solution will not be desirable in all cases.

In other instances the AAA server 542 may be able to retrieve the identity of a previously-assigned PDN SAE GW that is no longer being used by UE 520. In this case the previously assigned PDN SAE GW will simply be assigned as a new gateway, and no harm may result. Some inefficiency may occur in such a case, however, where the previously-assigned PDN SAE GW is now less than fully operational, or is experiencing heavy traffic. Again this may be at times avoidable where PDN SAE GW status information of some kind is provided to the PDN SAE GW in advance of the attach procedure being triggered. This status information be even in some embodiments be provided in such a manner as to indicate the type of PDN SAE GW selection process to be followed, either for one gateway in particular or for all of the gateways in gateway pool 530. In other embodiments, since soft state information including the identity of the currently-assigned PDN SAE GW may alternately be registered in a PCRF, the PCRD could also be used for redundant storage of this information along with the HSS 550, although this embodiment is not preferred. This form of mis-retrieval, that is retrieving a no-longer used PDN SAE GW identity, may also be reduced or eliminated by de-registering the PDN SAE GW identity where it is no longer being used for communications by a particular UE. De-registration may be performed simply by the sending of a notification to the HSS 550 from the relevant PDN SAE GW.

Figure 6:
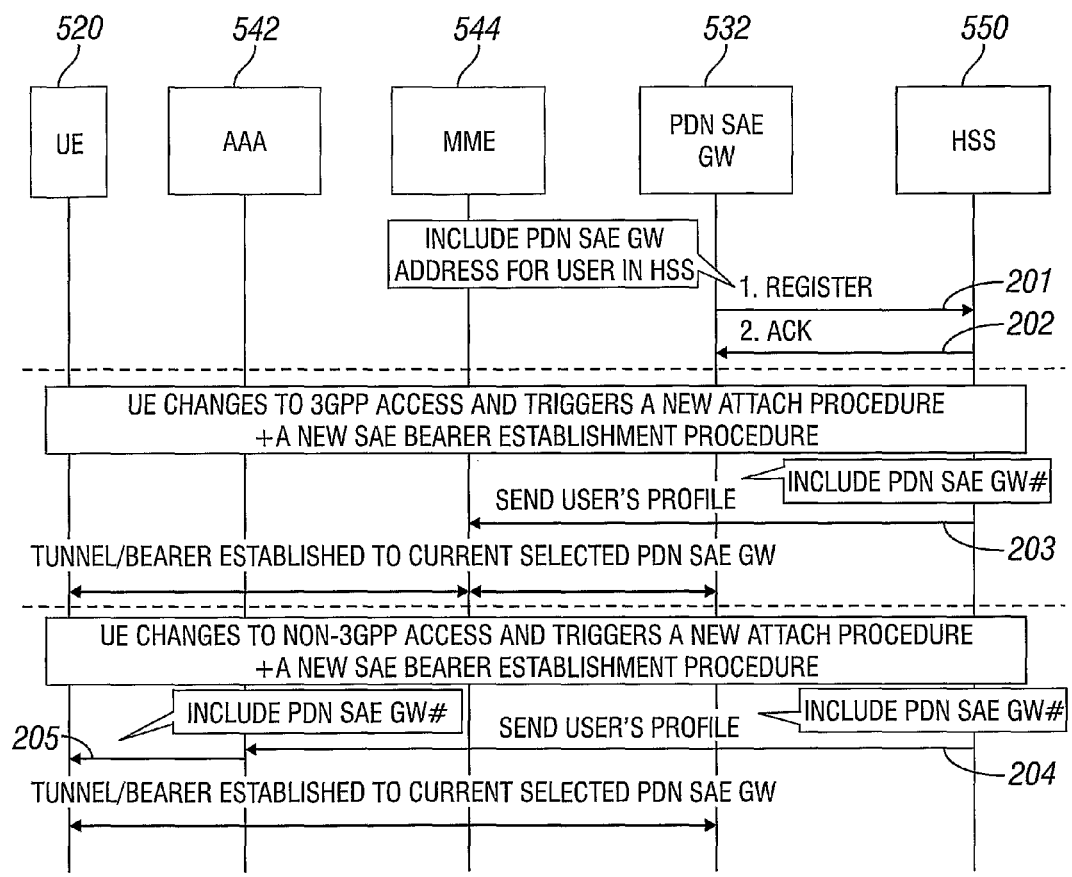
FIG. 6 is an annotated message flow diagram illustrating the communications carried out according to an embodiment of the present invention.

As should be apparent, the basic method of the present invention is also operative should the UE change from attachment to a non-3GPP access network to, for example, attachment to an LTE. An illustration of this is provided by FIG. 6. FIG. 6 is an annotated message flow diagram illustrating the communications carried out according to an embodiment of the present invention. The components depicted in FIG. 6 are also illustrated in FIGS. 5a and 5b. In the embodiment of FIG. 6, the message flow begins when a registration message 201 is sent from PDN SAE GW 532 to HSS 550, and (as preferred) is confirmed by an ACK (acknowledgement) message 202. The registration message 201 contains at least the identity of the UE 520 and the address of the currently-assigned PDN SAE GW 532, and may contain other information as well. The ACK 202 may be simply a confirmation of receipt of the registration message 201, but in some embodiments may also contain information such as the PDN SAE GW address to confirm that the correct identity has in fact been registered. No further signaling is required in this embodiment until, as noted in FIG. 6, the UE changes from its current access network to a 3GPP access network (not shown), triggering a new attach procedure as well as a new SAE bearer establishment. When this occurs, the HSS 550 sends to the MME 544 associated with the new 3GPP access network a user profile message 203 containing at least the address of the currently-assigned PDN SAE GW 532.

In the embodiment of FIG. 6, at this point the MME 544 uses the received PDN SAE GW identity to establish an SAE bearer from the UE 520 to the currently-assigned PDN SAE GW 532, which may be done according to the protocols currently in place for the telecommunications system. Of course, another communication path such as a tunnel may also be established instead of the bearer. In this embodiment, no further signaling is necessary until, as is noted, the UE changes from its attachment to a 3GPP access network to a non-3GPP access network. When this occurs, the HSS 550 sends to the AAA server 542 associated with the new non-3GPP access network a user profile message 204 containing at least the address of the currently-assigned PDN SAE GW 532. The AAA server 542 forwards to the UE 520 in message 205 the address of the currently-assigned PDN SAE GW 532, and a new SAE bearer (or tunnel) from the UE 520 to the PDN SAE GW 532 is established. Note that this process may continue indefinitely as for as many access-network changes as necessary. Although not shown in FIG. 6, it is preferred that a message also be sent to HSS 550 deregistering the PDN SAE GW 532 when it is no longer needed for communication involving UE 520. In addition, the HSS 550 may at any time send a message (also not shown) requesting that the PDN SAE GW 532 initiate a change to another PDN SAE GW. Where such a change is needed, for whatever reason, a similar message may also be sent by the PCRF to the PDN SAE GW 532 over the S7 interface (see FIG. 2).

Messages sent over the PDN SAE GW-HSS interface 521 (shown in FIGS. 5a and 5b) could be sent using a variety of protocols, for example the recently-developed Diameter protocol. Proposed are the following explicit Diameter messages and AVPs (attribute-value pairs) from the currently-assigned PDN SAE GW 532 to the HSS 550:

PDN SAE GW address registration request. This message includes a user identity and the PDN SAE GW address, and optionally includes the user's Home Address and Serving SAE GW address.

PDN SAE GW address re-registration request. This message provides an update/notification to the HSS of change regarding any of the data sent in a previous registration request. This message can also be used by the HSS to check if the current PDN SAE GW address is still valid.

PDN SAE GW address deletion (optional). This message informs the HSS that the user is no longer using this PDN SAE GW.

This list of messages is intended to be illustrative and not limiting; other messages may be formulated as well. Another exemplary protocol that could be used for messaging over the PDN SAE GW-HSS interface 521 is the SS7 MAP (mobile application part) protocol. Other protocols may also be used, with messages analogous to those proposed above.

Although the PDN SAE GW-HSS interface is new, there are advantages to its use. For example, it enables certain network-initiated operations that are performed directly on the bearer (or tunnel), such as establishment of a network- or operator-initiated bearer (or tunnel), network- or operator-initiated bearer (tunnel) teardown, and a change of PDN SAE GW for network or operator reasons.

Finally it is noted that some changes of access network attachment by the UE may not require that the method outlined above be used. For example, if the UE changes from one 3GPP access network to another, the appropriate bearer maintenance may simply be performed by the MME that is connected to both, permitting the assignment of the previously-assigned PDN SAE GW to be continued. This does not mean that the present invention may not be used, however, only that the advantage of its application is somewhat reduced.

In an alternate embodiment, rather than create a new interface between the HSS and the PDN SAE GW (or GW pool), existing interfaces could be used. Namely, the SAE Wx* interface between the AAA server and the HSS, and the S6a interface between the MME and the HSS (see FIG. 2). In this case, although the interfaces are currently defined, additional signaling would have to be provided for transmitting the necessary requests and information. Specifically, the PDN SAE GW address would be included in the user's profile and provided to the control plane entities (such as the AAA server and the MME). This would be provided at least whenever the UE attaches to a new access network, and whenever a new PDN SAE GW identity is to be registered, re-registered, or de-registered. In this embodiment, the PDN SAE GW related information would be carried in control plane messages (for example, via the Wx* and S6a interfaces—using specific AVPs if the Diameter protocol is used).

The description above is directed mostly to the registration of a currently-assigned PDN SAE GW, and to the procedures to be followed according to the present invention when the UE changes access networks. In most situations, the goal of the present invention is to continue using the currently-assigned p=gw when such a change occurs. In some instances, however, it may be desirable, or even necessary to assign a different PDN SAE GW, typically though not necessarily one from the same GW pool. For convenience the currently- (soon to be previously-) assigned PDN SAE GW will sometimes be referred to as the old PDN SAE GW, while the newly-assigned (or soon to be currently-assigned) PDN SAE GW will sometimes be referred to as the new PDN SAE GW. This situation may arise, for example, when the old PDN SAE GW must be unloaded to perform some kind of maintenance function, or is becoming overly-taxed. The changing of access by the UE and triggering of a new attach procedure may be considered a good time to also change to the new PDN SAE GW. This is only one situation and many other reasons may exist. In some cases, it may be necessary to assign a new PDN SAE GW even while the UE remains attached to its current access and is actively communicating. This aspect of the present invention will now be explained in detail.

Where a telecommunications system communicates with an external network through a plurality of gateways, perhaps forming a gateway pool, the decision to request that a UE communicating though the telecommunications system along a communications path terminating at one gateway should switch to another gateway may be made by, for example, a system or network node, or by an operator. In some cases it may be made by the gateway itself. In any event, once the decision to reassign gateways is made, both the gateway and the UE must be informed for the transition to take place. In accordance with the present invention, the identity of the new gateway must also be registered in the global anchor. Note that, as alluded to above, when a system is arranged according to the present invention, the old gateway may simply be deregistered from the global anchor. Referring to FIG. 4, at whatever subsequent time the UE attaches to a new access network, it will determine that no gateway is currently-assigned and proceed with new gateway assignment and registration (see steps 115 to 125 of FIG. 4). Presumably at that time, the old gateway will not be available for assignment and a new gateway will be assigned, unless the reason for deregistering the old gateway no longer exists at that time. This method is usually not preferred, however, as it is difficult to determine when a change in access networks will occur, if ever, or to dictate the identity of the new gateway unless some additional selection procedures are in place.

In the SAE scenario, a re-assignment of PDN SAE GW may, for example, be initiated by the PCRF in an attempt to reallocate network resources. In this case the PCRF may use SS7 signaling to inform the old PDN SAE GW of the identity of the new PDN SAE GW. The old PDN SAE GW then informs the serving SAE gateway of the re-assignment, for example using a PMIP or a modified-GTP message. The UE may be notified using a PDN SAE GW switch message according to Client-MIP. These messages are exemplary, and others may also be used. In an alternate embodiment, for example, the signaling could take place through the control plane entities.

Figure 7:
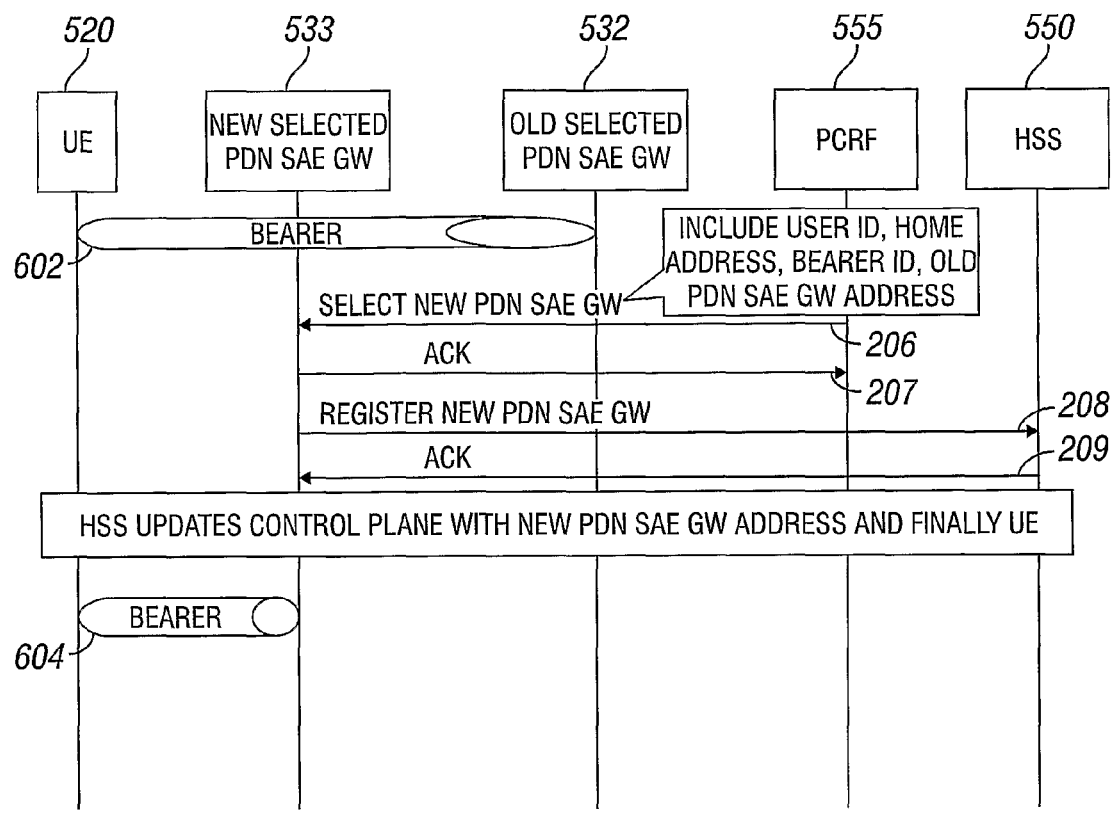
FIG. 7 is an annotated message flow diagram illustrating the communications carried out according to an embodiment of the present invention.

In accordance with a preferred embodiment of the present invention, the re-assignment of PDN SAE GWs is initiated by the PCRF sending a notification to the new PDN SAE GW, which in turn registers its identity with the HSS as shown in FIG. 7. FIG. 7 is an annotated message flow diagram illustrating the communications carried out according to an embodiment of the present invention. Initially, as can be seen in FIG. 7, a bearer 602 has already been established between UE 520 and PDN SAE GW 532, which in the this illustration represents the old PDN SAE GW. When the PCRF 555 determines that the communication path from the UE 520 should be switched to instead terminate at a new PDN SAE GW, in this embodiment PDN SAE GW 533 (see also FIG. 5), it sends reselect message 206 to new PDN SAE GW 533. The reselect message 206 includes at least the identity associated with UE 520 and its home address, as well as the bearer identity and the address of the old PDN SAE GW 532. Upon receipt of this message, the new PDN SAE GW 533 preferably sends an ACK message 207, indicating at least receipt of the reselect message 206. The new PDN SAE GW 533 also registers its identity on HSS 550, which responds with its own ACK messages 209. It is noted that this embodiment uses the proposed PDN SAE GW-HSS interface discussed above.

By registering as soon as it receives notification from the PCRF 555, the new PDN SAE GW 533 ensures that if the UE 520 switches access networks, it will trigger a re-attach procedure that retrieves the identity of the new PDN SAE GW 533 and uses it instead of the old PDN SAE GW 532. In some cases this system will simply wait for this to occur. In this embodiment, however, when new PDN SAE GW 533 registers with HSS 550, HSS 550 updates the control plane and notifies the UE 520 of the new assignment. Bearer 604 may then be established. Bearer 604 may then be used until UE 520 attaches to another access network or another PDN SAE GW re-assignment is made (or until the communication session is complete).

In an alternate embodiment (not shown), the PDN SAE GW-HSS interface is not required (or not used). Instead, the control plane entities are notified of the re-assignment from the old PDN SAE GW to the new PDN SAE GW. The control plane entities, for example the AAA server 542 and the MME 544, handle registering the identity of the new PDN SAE GW 533 with the HSS 550, and also the notification of the UE 520 so that the new bearer 604 may be established.

Figure 8:
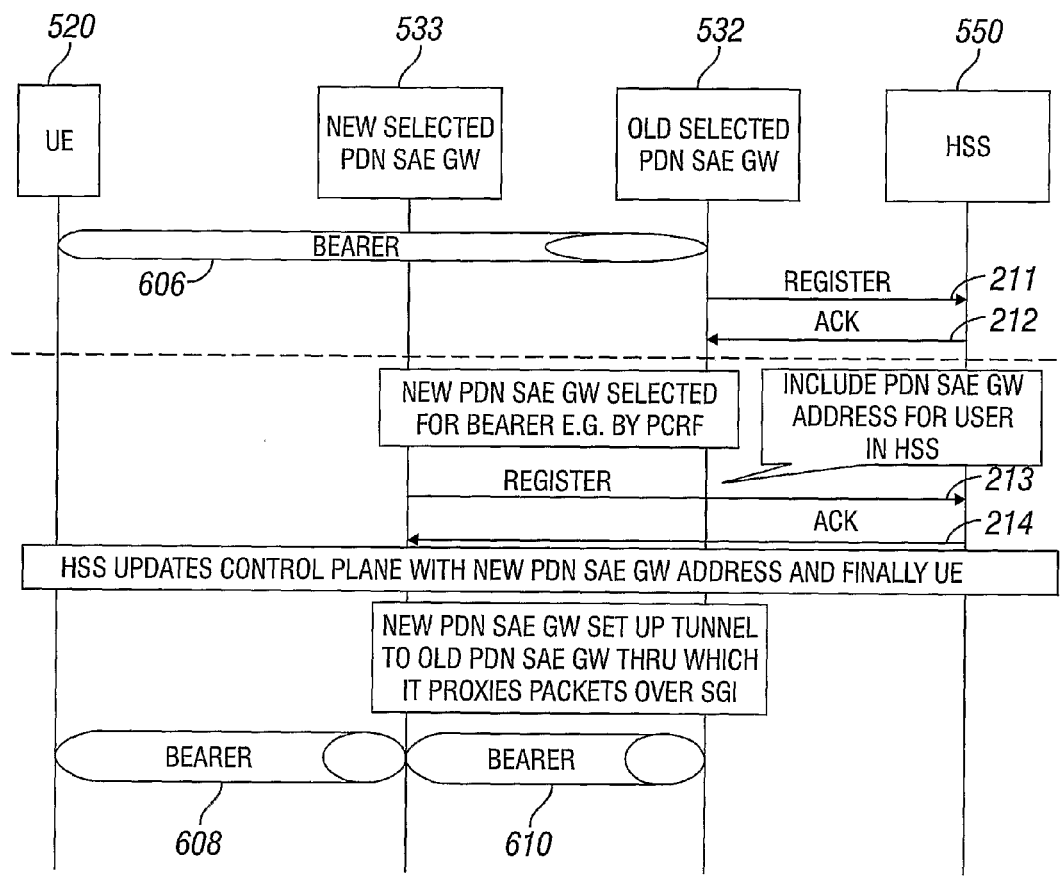
FIG. 8 is an annotated message flow diagram illustrating the communications carried out according to an embodiment of the present invention.

As mentioned above, a PDN SAE GW re-assignment may be made while a communication session is in progress. When this occurs, for a short time packets may be received on the old PDN SAE GW 532, even though the new PDN SAE GW 533 is becoming operational. This may result in a real or perceived disruption in service. Two mechanisms are proposed for alleviating this effect. The first is illustrated in FIG. 8. FIG. 8 is an annotated message flow diagram illustrating the communications carried out according to an embodiment of the present invention. In this embodiment, a bearer 606 has been established, terminating at old PDN SAE GW 532, which sends a registration message 211 to the HSS 550. Upon successful receipt of the registration message 211, HSS 550 replies with an ACK message 212. Communications using bearer 606 then continue until terminated or until establishment of a new bearer is required. In the embodiment of FIG. 8, at some point the PCRF determines that communications with UE 520 should be switched to a new PDN SAE GW, and notifies PDN SAE GW 533 of this re-assignment. PDN SAE GW 533 then sends a registration message 213 to HSS 550. Note that here again the existence of a PDN SAE GW-HSS interface is presumed.

When HSS 550 receives the registration message from new PDN SAE GW 533, it updates the user's soft state information and transmits an ACK message 214. HSS 550 also notifies the control plane entities and UE 520 of the new PDN SAE GW assignment. A bearer 608 is established between UE 520 and new PDN SAE GW 533. A bearer 610 (or tunnel) is also established between new PDN SAE GW 533 and old PDN SAE GW 532, which maintains an SGi interface to the external network. Old PDN SAE GW 532 may in this way buffers data and forwards it to the new PDN SAE GW 533 when bearer 610 (or a tunnel) has been established. Note a disadvantage if this embodiment is that the old-pw 532 must remain involved in the communications for some time. Of course, should UE 520 change access networks and trigger a new attach procedure, it will retrieve the identity of new PDN SAE GW as the currently-assigned PDN SAE GW and the role of old PDN SAE GW 532 may be eliminated.

Figure 9:
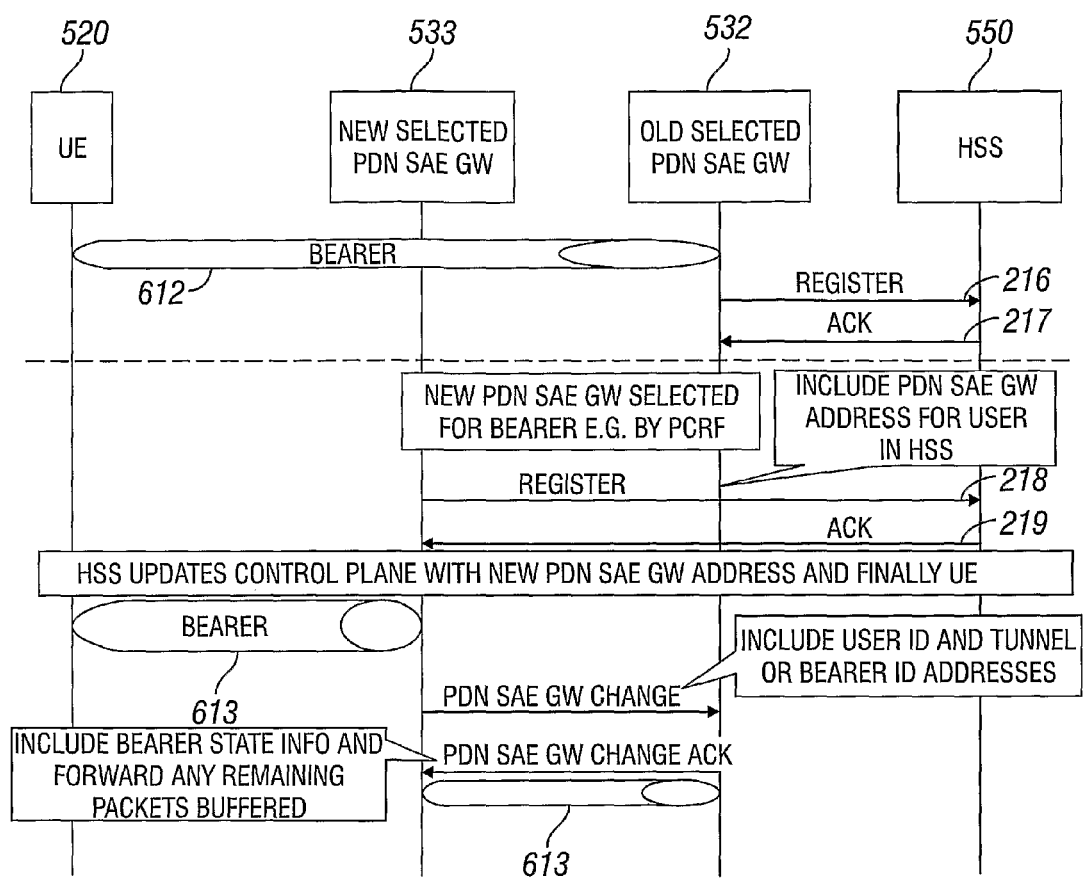
FIG. 9 is an annotated message flow diagram illustrating the communications carried out according to an embodiment of the present invention.

Another mechanism for minimizing service disruptions during PDN SAE GW reassignment is i\is shown in FIG. 9. FIG. 9 is an annotated message flow diagram illustrating the communications carried out according to an embodiment of the present invention. In this embodiment, a bearer 612 has been established, terminating at old PDN SAE GW 532, which sends a registration message 216 to the HSS 550. Upon successful receipt of the registration message 216, HSS 550 replies with an ACK message 217. Communications using bearer 612 then continue until terminated or until establishment of a new bearer is required. In the embodiment of FIG. 9, at some point the PCRF determines that communications with UE 520 should be switched to a new PDN SAE GW, and notifies PDN SAE GW 533 of this re-assignment. PDN SAE GW 533 then sends a registration message 218 to HSS 550 over the PDN SAE GW-HSS interface.

In the embodiment of FIG. 9, a bearer 613 is established from UE 520 and terminating at new PDN SAE GW 533. New PDN SAE GW 533 then sends a PDN SAE GW change message 220 to old PDN SAE GW 532, which confirms receipt with and ACK message 221. Bearer 614 is established and any remaining packets buffered at old PDN SAE GW 532 are forwarded to new PDN SAE GW 533.

In the embodiments of FIGS. 8 and 9, the old PDN SAE GW either establishes itself as a proxy and remains involved in the communication session, or buffers packets it receives while the re-assignment is being executed, which can later be forwarded to the new PDN SAE GW when it is ready. In this latter embodiment, the participation of the old PDN SAE GW is then eliminated. In either embodiment, however, the old PDN SAE GW also sends any relevant bearer state data to the new PDN SAE GW. The relevant bearer state data may include, but is not limited to, legal interception data, policy enforcement data, or charging information. In addition, any relevant policy rules and decisions received by the old PDN SAE GW from, for example the PCRF, may also be forwarded to the new PDN SAE GW. Forwarding this information may reduce the signaling required between the new PDN SAE GW and the PCRF or other entities as the new PDN SAE GW assumes its role terminating the communication path from the UE to the SGi interface.

In the embodiments described above, the present invention provides for efficient UE communications to external networks via a multiple-access telecommunication system while minimizing service disruptions by permitting a global anchor address to be stored in a central server common to all or as many access networks as possible. The advantage of the present invention is the greatest where UEs switch between 3GPP and non-3GPP access networks because they are most likely to experience the service disruption problems addressed by the present invention. The communication mechanism established between the global anchor may also be used for other purposes, however, such as communicating notifications of changes that affect the bearer.

Currently, nodes such as: HSSs, PDN SAE GWs, PCRFs, etc; are mostly implemented by computer-based apparatuses. Accordingly, computer programs comprising computer-readable program codes are loaded in computer-based apparatuses of telecommunications systems, causing them to behave according to a predefined manner, as determined by the respective program codes, which are in accordance to the specific functionality specified for the telecommunications nodes these apparatuses implement. Thus, those skilled in creating and/or modifying computer programs, would, without departing of the teachings of the present invention, readily apply them to create and/or modify computer programs suitable to be loaded in a computer-based apparatuses, so as to make them to behave according to any of the described embodiments.

Although the present invention has been described in detail, those skilled in the art should understand that they can make various changes, substitutions and alterations herein without departing from the spirit and scope of the invention in its broadest form.

The invention claimed is:

1. A method of providing access to an external network via a telecommunications system coupled to a plurality of access networks and coupled to the external network though a gateway pool, said method comprising the steps of:
   detecting that a user equipment (UE) has attached to an access network coupled to the telecommunications system;
   determining whether a gateway has previously been assigned to handle communications between the UE and the external network;
   assigning a gateway of the gateway pool for handling communications between the UE and the external network;
   registering an identifier associated with the assigned gateway at an anchor server that is in communication with each of the plurality of access networks, wherein the anchor server is a Home Subscriber Server (HSS); and,
   establishing a communication path from the UE to the assigned gateway.

2. The method according to claim 1, further comprising, upon determining that a gateway has previously been assigned to the UE, using the previously-assigned gateway when establishing the communication path.

3. The method according to claim 1, further comprising the step of determining whether the previously-assigned gateway is available for use and, if not, assigning a different gateway for handling communications between the UE and the external network.

4. The method according to claim 1, further comprising the step of re-registering the identifier of the gateway at the anchor server.

5. The method according to claim 1, wherein the communication path is a bearer.

6. The method according to claim 1, wherein the communication path is a tunnel.

7. The method according to claim 1, further comprising the steps of:

detecting that the UE has attached to a second access network;
retrieving the previously-assigned gateway identity; and,
establishing a communication path from the UE to the previously-assigned gateway.

8. The method according to claim 7, further comprising the step of re-registering the gateway in the anchor server.

9. The method according to claim 7, wherein the second access network is a non-3GPP access network.

10. The method according to claim 7, wherein the second access network is an LTE access network.

11. The method according to claim 1, further comprising the steps of:
determining that a new gateway should be used for handling communications between the UE and the external network; and,
notifying the old gateway of the new assignment.

12. The method according to claim 11, further comprising the steps of registering an identifier associated with the new gateway in the anchor server and notifying the UE of the new assignment.

13. The method according to claim 11, further comprising the step of using the old gateway as a proxy after a communication path has been established between the UE and the new gateway.

14. The method according to claim 11, further comprising the steps of buffering packets in the old gateway and forwarding the packets to the new gateway after a communication path has been established between the UE and the new gateway.

15. The method according to claim 1, wherein the gateway is a Packet Data Network (PDN) System Architecture Evolution (SAE) Gateway (PDN SAE GW).

16. A system for providing a user equipment (UE) access to an external network via a multi-access telecommunications system, said system comprising:
an anchor node arranged to maintain information related to the UE, wherein the anchor node is a Home Subscriber Server (HSS);
a plurality of gateways arranged to facilitate communications between the telecommunications system and the external network, wherein each gateway of the plurality of gateways is arranged to register in the anchor node when it has been assigned to handle communications between the UE and the external network; and,
at least one control plane entity in communication with the anchor node and arranged to detect when the UE has attached to an access network of the telecommunications system and to assign a gateway for handling communications between the UE and the external network.

17. The system according to claim 16, wherein the at least one control plane entity is further arranged to retrieve from the anchor node the identity of a previously-assigned gateway, if any, subsequent to detecting that the UE has attached to an access network.

18. The system according to claim 16, wherein the gateways are each a Packet Data Network (PDN) System Architecture Evolution (SAE) Gateway (PDN SAE GW).

19. An anchor node for use in a multi-access telecommunications system for facilitating communications between a user equipment (UE) and an external network through a gateway, said anchor node arranged to:
register an identifier associated with the gateway upon receiving a registration message; and,
transmit the identifier to a control plane entity during an attach procedure, wherein the gateway is a Packet Data Network (PDN) System Architecture Evolution (SAE) Gateway (PDN SAE GW) and the anchor node is a Home Subscriber Server (HSS).

20. The anchor node of claim 19, said anchor node having a direct interface with the PDN SAE GW.

* * * * *

UNITED STATES PATENT AND TRADEMARK OFFICE
CERTIFICATE OF CORRECTION

PATENT NO. : 8,483,211 B2  
APPLICATION NO. : 12/531356  
DATED : July 9, 2013  
INVENTOR(S) : Walker Page 1 of 1

It is certified that error appears in the above-identified patent and that said Letters Patent is hereby corrected as shown below:

In the Specification

In Column 1, Line 18, delete "though" and insert -- through --, therefor.

In Column 1, Line 42, delete "but my also" and insert -- but may also --, therefor.

In Column 2, Line 50, delete "e.g" and insert -- e.g. --, therefor.

In Column 2, Line 54, delete "though" and insert -- through --, therefor.

In Column 3, Line 44, delete "PDN SAE 332" and insert -- PDN SAE GW 332 --, therefor.

In Column 3, Line 61, delete "previously assigned" and insert -- previously-assigned --, therefor.

In Column 4, Line 64, delete "previously assigned" and insert -- previously-assigned --, therefor.

In Column 9, Line 14, delete "previously assigned" and insert -- previously-assigned --, therefor.

In Column 9, Line 28, delete "PCRD" and insert -- PCRF --, therefor.

In Column 11, Line 39, delete "though" and insert -- through --, therefor.

In Column 12, Line 15, delete "which in the this" and insert -- which in this --, therefor.

In Column 13, Line 17, delete "old-pw 532" and insert -- old PDN SAE GW 532 --, therefor.

In Column 13, Line 24, delete "is i\is" and insert -- is --, therefor.

In the Claims:

In Column 14, Line 34, in Claim 1, delete "though" and insert -- through --, therefor.

Signed and Sealed this  
Tenth Day of December, 2013

Margaret A. Focarino  
*Commissioner for Patents of the United States Patent and Trademark Office*